(12) United States Patent
Mayle et al.

(10) Patent No.: US 6,182,022 B1
(45) Date of Patent: Jan. 30, 2001

(54) AUTOMATED ADAPTIVE BASELINING AND THRESHOLDING METHOD AND SYSTEM

(75) Inventors: Gary E. Mayle, Windsor; Joseph P. Reves, Colorado Springs; Jayson A. Clubb, Woodland Park; Loren F. Wilson, Fort Collins, all of CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/013,672

(22) Filed: Jan. 26, 1998

(51) Int. Cl.[7] .............................. G06F 11/30; G06F 15/00; G21C 17/00
(52) U.S. Cl. .............................. 702/182; 702/185; 714/37
(58) Field of Search .............................. 702/84, 81, 82, 702/58, 59, 179, 182, 183, 184, 185, 188, 193; 714/37, 39, 25, 48, FOR 702, 104, 135, 139, 170, 171

(56) References Cited

U.S. PATENT DOCUMENTS

| | | | |
|---|---|---|---|
| 4,378,494 | * | 3/1983 | Miller ...................................... 702/82 |
| 5,339,257 | * | 8/1994 | Layden et al. .......................... 702/84 |
| 5,828,786 | * | 10/1998 | Rao et al. ............................. 382/236 |
| 5,941,996 | * | 8/1999 | Smith et al. ............................ 714/47 |

* cited by examiner

Primary Examiner—Marc S. Hoff
Assistant Examiner—Manuel L. Barbee

(57) ABSTRACT

A system and method for automatically constructing a baseline for an attribute of a monitored system, calculating a threshold based on the constructed baseline, and feeding the threshold back into the monitored system is presented. In accordance with the invention, a metric corresponding to an attribute of interest of a monitored system is extracted and compared with a current normal threshold associated with the attribute. An event notification is generated if the extracted metric is not within a limit defined by the current normal threshold. A baseline is calculated based on a relevant subset of extracted metrics, from which a new current normal threshold is calculated. The current normal threshold is reconfigured with the new current normal threshold. In preferred embodiments, an alarm is generated if one or more event notifications meet the conditions of pre-specified rules. Newly calculated current normal thresholds are limited to a service level limit which defines a boundary of the acceptable level of operation the attribute, and a service level exception is generated, if the newly calculated current normal threshold is not within that limit. Reports are generated which summarize the performance of the monitored attributes, indicate which monitored attributes are out-of-control, and prioritize the order in which out-of-control attributes receive available engineering resources.

20 Claims, 4 Drawing Sheets

AUTOMATED ADAPTIVE BASELINING AND THRESHOLDING METHOD AND SYSTEM

Field of the Invention

The present invention pertains to fault analysis, and, more particularly, to a method and system for automatically constructing a baseline, deriving a threshold, and reconfiguring a fault detection system with the derived threshold.

BACKGROUND OF THE INVENTION

The design, maintenance, operation, and or repair of a system, whether it is a computer network, an electronic subassembly undergoing fabrication on a manufacturing line, an airport or traffic control system, or any other type of system, is assisted by use of a fault detection system. Present day fault detection systems typically monitor various system parameters of the monitored system, determine whether they conform to desired operating thresholds, and notify the appropriate entity when the monitored parameters move outside the limits defined by the desired operating thresholds. These types of fault detection systems are useful for alerting a system administrator, design engineer, or manufacturing line operator of faults occurring in the monitored system. In the past, however, diagnosis of the monitored system's problems has been left to the experience of the appropriate engineering resources to determine which areas of the system to fix, and in which order.

Accordingly, a need exists for a method and system for automatically identifying the attributes of a monitored system which cause or exhibit system problems. In addition, in an environment where only a limited number of available engineering resources are available, or in which limited time or funds are available, a need also exists for a method and system that automatically prioritizes the allocation of engineering resources to those areas of the monitored system where the expenditure of the resources provide the most benefit.

Present day fault detection systems which are designed to detect when a system attribute is out of a normal operating range, typically operate by comparing realtime attribute measurement values, or "metrics", with a statically configured threshold value. The threshold is determined, based upon theoretical equations or experience, and manually set by a system engineer. Present day fault detection systems range from providing either only one or a small few globally applicable thresholds, up to many individual thresholds tailored to each respective attribute. A system configured with a single or only a small few globally available thresholds is easier to maintain and requires less manual intervention by a system engineer, but does so at the cost of flexibility and the ability to tailor a threshold according to the normal operating range of each individual attribute. More sophisticated fault detection systems allow more control over the ability to pinpoint faults by employing more thresholds which are respectively tailored to a single or only a few attributes. These systems, however, are very costly in terms of the engineering time required for interpretation of the observed data used to determine each individual threshold, and in terms of the manual intervention required to set each individual threshold. Accordingly, a need exists for a system and method for automatically constructing a normal operating range, or "baseline", for each individual attribute, deriving a threshold for each attribute, and reconfiguring the fault detection system with the derived thresholds.

SUMMARY OF THE INVENTION

The present invention is a system and method for automatically constructing a baseline for an attribute of a monitored system, calculating a threshold based on the constructed baseline, and feeding the threshold back into the monitored system. In addition, the invention also provides a system and method for automatically identifying the attributes of a monitored system which are detected to be substantially outside their normal operating range, and for prioritizing the allocation of engineering resources to those areas of the monitored system where the expenditure of the resources provide the most benefit.

In accordance with the invention, a metric corresponding to an attribute of interest of a monitored system is extracted and compared with a current normal threshold associated with the attribute. An event notification is generated if the extracted metric is not within a limit defined by the current normal threshold. A baseline is calculated based on a relevant subset of extracted metrics, from which a new current normal threshold is calculated. The current normal threshold is reconfigured with the new current normal threshold. In preferred embodiments, an alarm is generated if one or more event notifications meet the conditions of a rule, such as a duration rule which requires the collected metrics to be beyond the current normal threshold for a pre-determined amount of time, or a frequency rules which requires a pre-determined number of metrics to be beyond the current normal threshold during a pre-determined amount of time. In addition, a newly calculated current normal threshold is preferably limited to a service level limit which defines a boundary of the acceptable level of operation of the attribute if the newly calculated current normal threshold is not within that limit. A service level exception is generated if the newly calculated current normal threshold is limited to said service level limit to indicate that the current normal threshold itself is out of control. Reports are generated which summarize the performance of the monitored attributes, indicate which monitored attributes are out-of-control, and prioritize the order in which out-of-control attributes receive available engineering resources.

A fault detection system in accordance with the invention includes a data collector which extracts metrics corresponding to various attributes of interest from a monitored system. The fault detection system includes a threshold comparator configured with a current normal threshold for each monitored attribute and which compares each extracted metric to its corresponding current normal threshold. If the extracted metric is not within a limit defined by its current normal threshold, an event notification is generated. A statistical analyzer is coupled to the data collector which calculates a baseline based on a relevant subset of previously collected extracted metrics. A threshold processor is coupled to the statistical analyzer and calculates a new current normal threshold based on the calculated baseline. A threshold implementor then reconfigures the current normal threshold associated with a given attribute with its newly calculated current normal threshold. An event processor receives event notifications and generates alarms when the event notifications satisfy one or more rules or conditions on which to alarm. A sanity checker limits newly calculated current normal thresholds to a service level limit which defines a boundary of an acceptable level of operation of an attribute and a service level exception generator generates a service level exception if the newly calculated current normal threshold does not come within the service level limit. A report generator identifies those monitored attributes which are adversely affecting performance of the monitored system.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION OF THE INVENTION

A glossary of terms is included below to assist the reader in understanding the invention.

GLOSSARY

| | |
|---|---|
| Attribute- | A parameter that is being monitored (e.g., percent system utilization, temperature, response time, etc.). |
| Metric- | A measured value for an attribute. |
| Baseline- | A normal operating range for an attribute. |
| Threshold- | A value calculated from the baseline and used to set the boundary of normal behavior. The calculation of a threshold value from a baseline may be based on only a subset of collected metrics (e.g., during hours of 8:00 a.m. and 5:00 p.m. when interactive users of a monitored network system are sensitive to real-time performance). |

Figure 1:
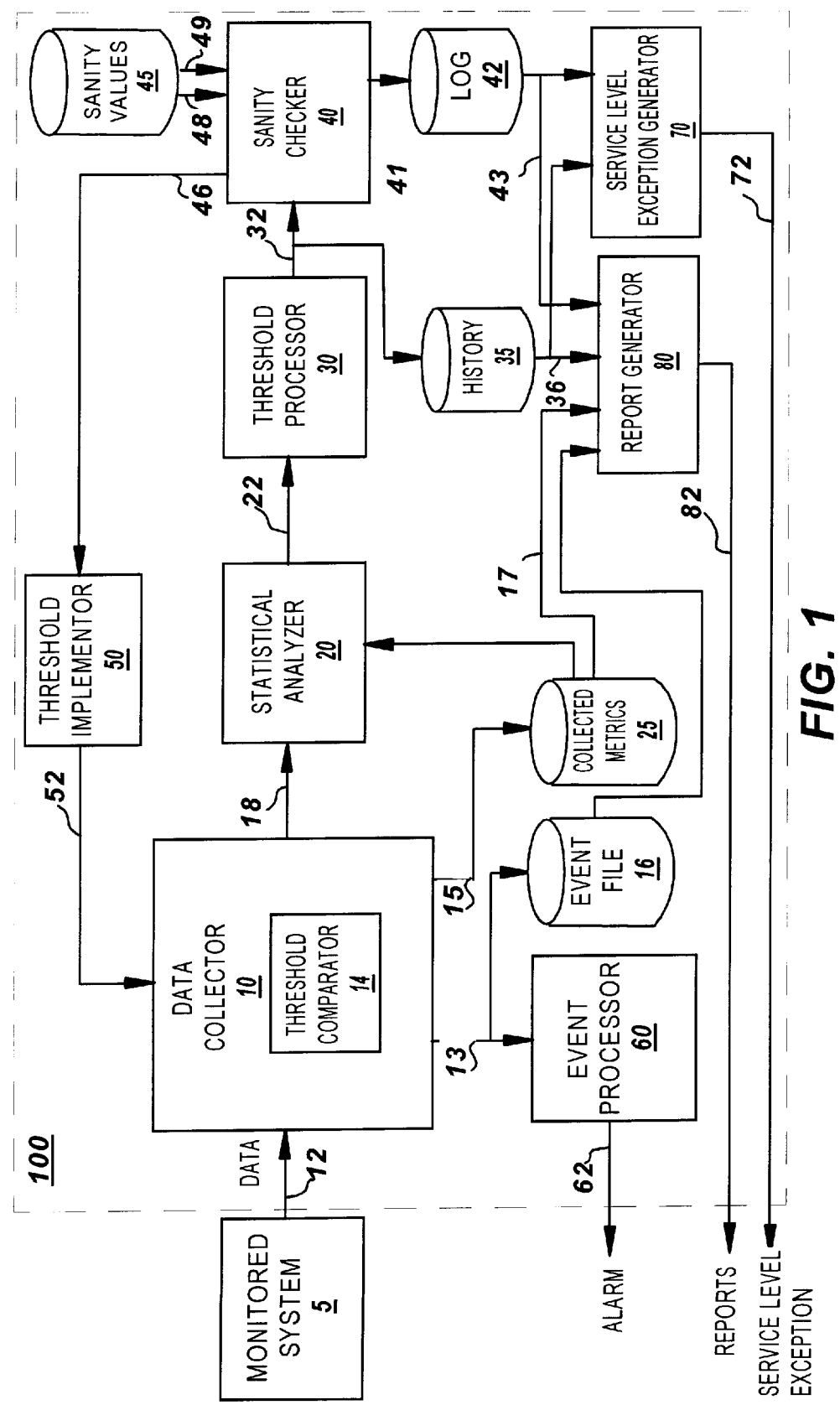
FIG. 1 is a block diagram of an environment in which the invention operates.

FIG. 1 is a block diagram of an environment in which the invention operates. The environment includes a fault detection system 100 in accordance with the invention and a monitored system 5. Monitored system 5 is any system, device, or application for which it is desired to statistically monitor, such as a network computer system, or an electronic subassembly being manufactured on a manufacturing line.

Fault detection system 100 includes data collector 10 threshold comparator 14, collected metrics file 25, statistical analyzer 20, threshold processor 30, sanity checker 40, database 45, threshold implementor 50, and event processor 60. Data collector 10 is a hardware device, such as a network switch controller or a piece of automated test equipment. Alternatively, data collector 10 is a software application such as a network system management program which executes on a network system to collect statistical samples from the network environment. Data collector 10 receives incoming data stream DATA 12 from monitored system 5. Data stream DATA 12 comprises values read from various system components, and is formatted appropriate to the particular application. For example, data stream DATA 12 may range from a simple series of numerical values represented in ASCII format to a sophisticated series of data packets formatted in compliance with the well-known Simple Network Management Protocol (SNMP), an Internet Standard based upon a body of Internet Engineering Task Force "Request for Comments" (RFC) standards documents. Data collector 10 extracts metrics for various attributes of the monitored system 5 from data stream DATA 12. Metrics are measurements of an attribute read directly from a component of the monitored system 5 itself and or are measurements of an attribute derived from one or more of the collected data values read from monitored system 5 which are included in data stream DATA 12. Once data collector 10 extracts a metric from data stream DATA 12, the metric is preferably stored in collected metrics file 25.

Data collector 10 includes threshold comparator 14 which compares a metric extracted component attribute value from DATA 12 with previously calculated current normal thresholds 52 for each attribute, determines if any metrics are outside their attribute's normal limits, and generates an event notification 13, for any attribute that is outside the limit defined by its respective current normal threshold. Event processor 60 processes event notifications 13 and generates alarms 62. Event processor 60 generates an alarm for each event notification 13, or alternatively, as discussed hereinafter, processes event notifications 13 according to a set of rules prior to generating an alarm 62. The generated alarm 62 is simply logged to an event file or triggers a paging or e-mailing function which notifies a system administrator.

Figure 2:
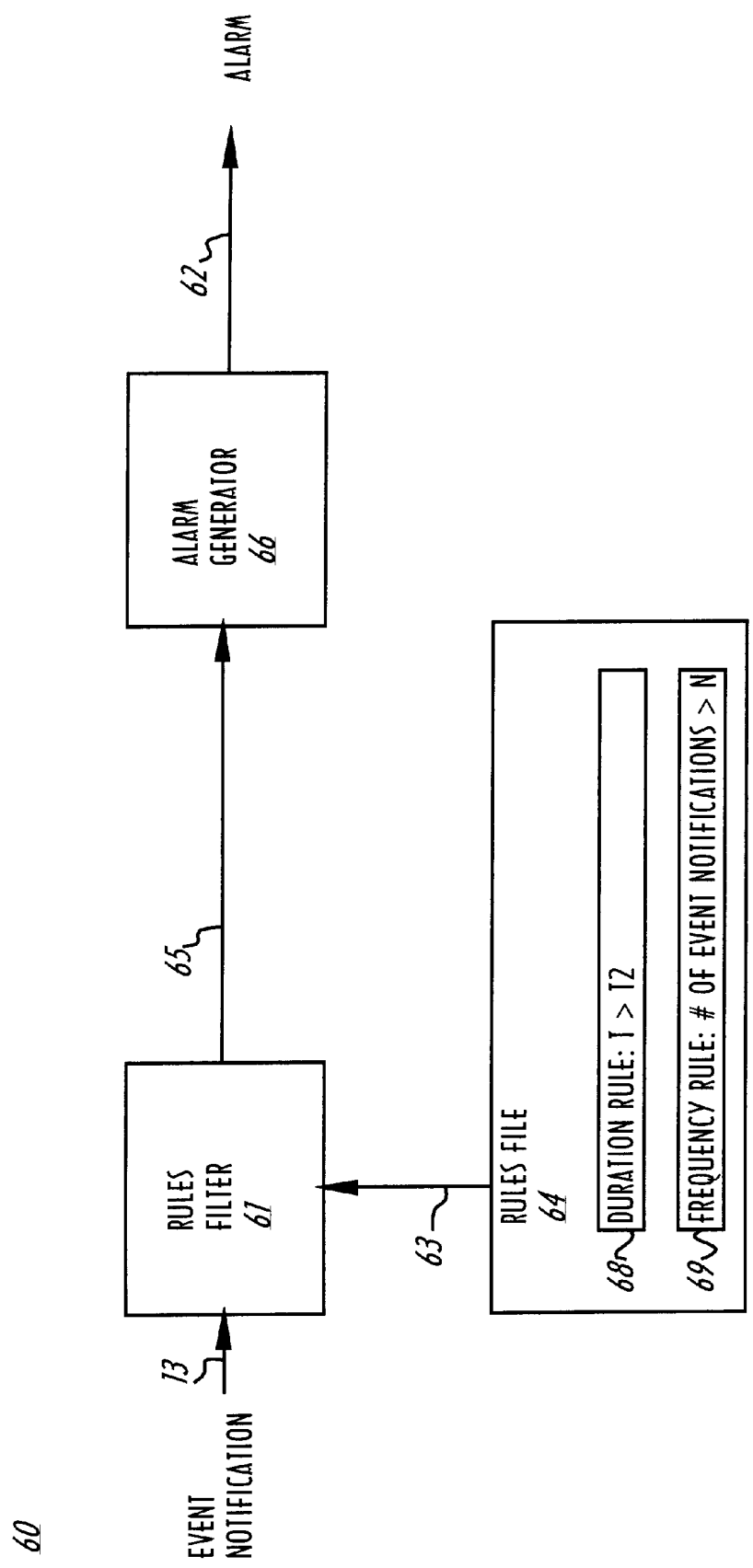
FIG. 2 is a block diagram of one embodiment of an event processor.

FIG. 2 is a block diagram of one embodiment of event processor 60. As just described, event processor 60 receives an event notification 13 from data collector 10 when an attribute exceeds or falls short of its corresponding current normal threshold. Before generating a realtime event, event notification 13 is preferably filtered by a rules filter 61. Rules filter 61 preferably receives rules 63 from rules file 64. Preferably, rule 63 includes a duration rule 68 which specifies the duration of the threshold exceeded event required, and a frequency rule 69 which specifies a frequency of event notifications required before generating an event.

Figure 3:
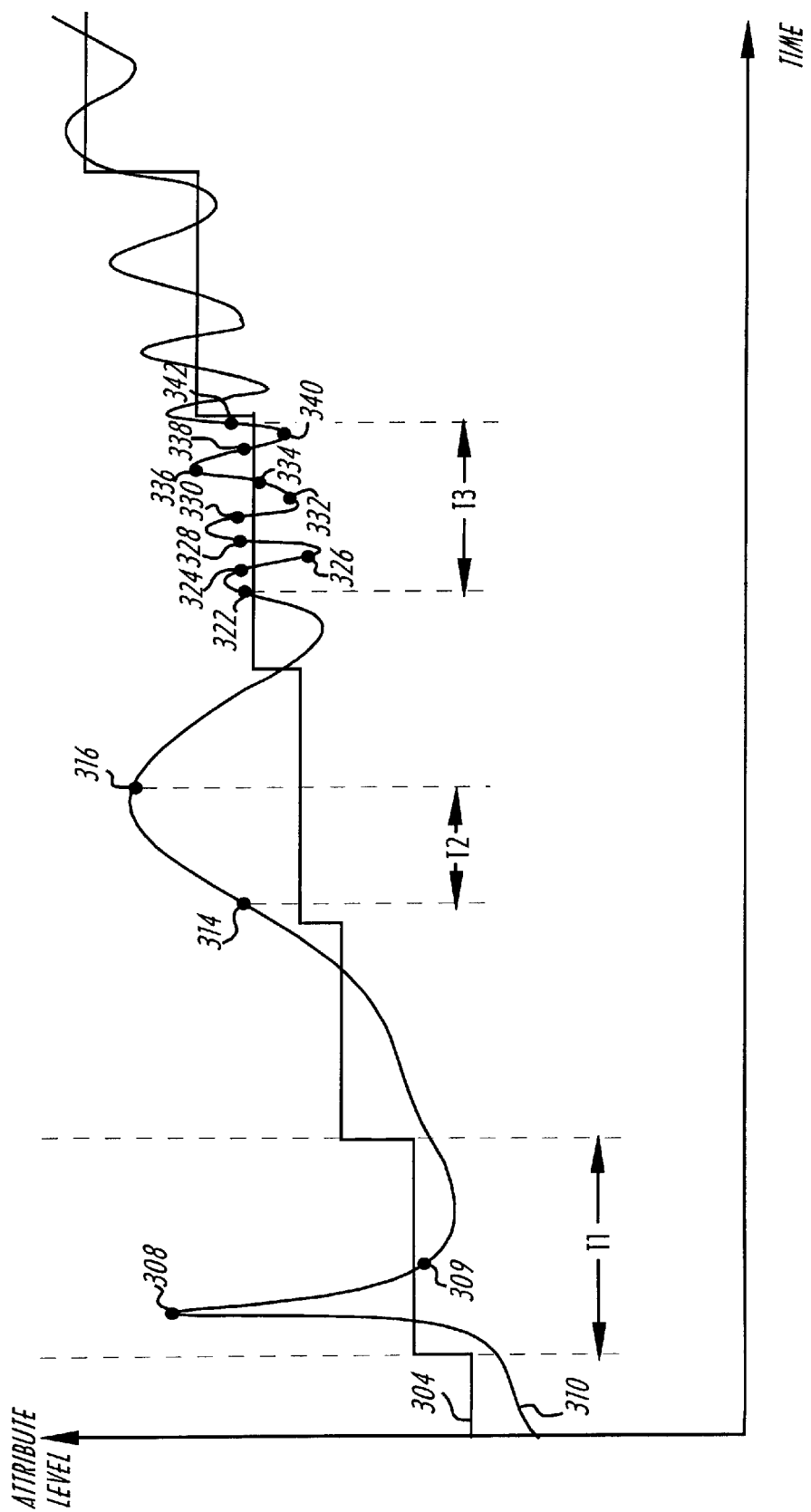
FIG. 3 is a graph illustrating a collected metrics curve and a current normal threshold curve plotted over time.

FIG. 3 is a graph of a curve 310 which represents a series of collected metrics for an example attribute y and a curve 304 which represents the current normal threshold 52 calculated for attribute y, both plotted over time. What FIG. 3 shows is that current normal threshold 52 is calculated and updated periodically (preferably configurable) for a sliding window of time T1, which is preferably configurable by the system administrator. The value of current normal threshold 52 and hence the shape of curve 304 is based on a recent period of history determined by the length T1 of the sliding window of time set by the system administrator. Thus, as the collected metrics 310 for attribute y move up and down over time, the current normal threshold 304 is recalculated periodically and thus also periodically moves up and down over time. Current normal threshold 304 allows a system administrator or engineer to identify those periods of time when the collected metric for attribute y is temporarily outside the boundary (represented by current normal threshold 304) of attribute y's current normal operating range. Thus, the current normal threshold 304 calculated by threshold processor 30 (and preferably limited by sanity checker 40) provides the system administrator or design engineer with an instant spot check. Any collected metric which is outside the boundaries of the normal operating range as defined by current normal threshold 304 indicates that something is happening which is going to adversely impact the monitored system 5.

Generally, it is not necessarily desirable to alarm the system administrator on the collection of a single metric which is outside the boundary of the normal operating range of an attribute. This is illustrated by single collected metric 308 which exceeds current normal threshold 304 and causes a spike in curve 310. As illustrated in FIG. 3, however, the next collected metric 309 shows that the attribute immediately returns to its current normal operating range. To avoid alarming on temporary spikes such as that caused by metric 308 as described previously, event processor 60 filters event notifications according to a set of rules before generating an alarm 62. As an illustration, collected metrics curve 310 begins exceeding current normal threshold 304 at the collection of metric sample 314. Duration rule 68 requires the collected metrics curve 310 to continue to exceed current normal threshold 304 for a period of time T2 before generating an event. Accordingly, at time corresponding to the collection of metric sample 316 an alarm 62 is generated by event processor 60 of FIG. 1. Time T2 is preferably configurable by the system administrator. Frequency rule 69 requires the number of collected metrics 310 to exceed current normal threshold 304 a pre-determined number of times N over a pre-determined period of time T3 before generating an event. For example, suppose frequency rule 69 requires the collected metrics 310 to exceed current metric threshold 304 seven or more times over sliding time period T3 before generating an alarm. In FIG. 3, beginning with the collection of metric sample 322 through the collection of the next contiguous metric samples 324, 326, 328, 330, 332, 334, 336, 338, 340 and 342 during time period T3 seven metric samples exceed current normal threshold while four metric samples fall short of current normal threshold. Thus, although metric curve 310 moves back and forth between above and below current normal threshold 304 during the window of time defined by T3, and thus might not be detected by the duration rule 68, frequency rule 69 is designed to detect a trend in direction of the collected metrics curve 310 for an attribute y that needs to be analyzed by the system administrator and which may be adversely impacting an area of monitored system 5 measured by attribute y. Rules file 64 preferably includes a set of rules 68, 69 for each attribute monitored by fault detection system 100. In a preferred embodiment, independent values for time periods T2 and T3 and frequency N exist for each individual attribute and are tailored to their corresponding attribute to provide fine tuning. The ability to fine tune when alarms are generated allows the highest priority problems to be identified sooner, which in turn allows available troubleshooting resources to be allocated in realtime to the highest priority problems. If event processor 60 is also configured to record each event notification 13 in an event file (not shown), the event file is a history of realtime violations by an attribute of it current normal threshold 52.

Referring back to FIG. 1, statistical analyzer 20 periodically retrieves a plurality of metrics 17 from collected metrics file 25 which were collected for a given attribute over time. A baseline 22 which represents the normal operating range for the attribute is constructed from a relevant subset of the retrieved metrics 17. For example, suppose metrics are collected every half a minute for attribute y which represents system utilization, and it is desired to define the normal operating range for attribute y to be during business hours only (e.g., 8:00 a.m. to 5:00 p.m.). In this example, statistical analyzer 20 extracts from collected metrics file 25 only those collected metrics for attribute y that were collected during business hours over a sliding window of time T1 (e.g., a week or a month). These extracted metrics are the raw data which represent the baseline 22 of attribute y over sliding window of time T1. Statistical analyzer 20 performs statistical analysis on the raw data to generate a representation of the normal operating range of attribute y during time period T1 (e.g., mean y$\pm 3\sigma$) and outputs this representation as baseline 22. In an alternative embodiment, baseline 22 comprises the raw data itself. In one embodiment, statistical analyzer 20 is implemented with the widely available statistical analysis package called SAS, manufactured by SAS Institute, Inc.

Threshold processor 30 performs statistical analysis on baseline 22 which was constructed for the attribute by statistical analyzer 20 generates a new current normal threshold 32 for the attribute, and preferably stores the new current normal threshold 32 in a history file 35. For illustrative purposes only and not by way of limitation, each new current normal threshold 32 generated by threshold processor 30 is herein defined as the mean plus three standard deviations above the mean (i.e., mean+$3\sigma$). In this embodiment, for example, if the mean of attribute x is fifty (50) and the standard deviation is ten (10), threshold processor 30 outputs a new current normal threshold 32 for attribute x of eighty (mean+$3\sigma$=50+3*10=80). Preferably, the meaning of each newly calculated current normal threshold 32 is transparent to threshold processor 30. Accordingly, threshold processor 30 is unaware that attribute x, for example, represents a number of units per second (e.g., a number of memory accesses per second in a network system), whereas attribute y, for example, represents a percentage of system utilization (e.g., percent utilization by each network processing node). Accordingly, threshold processor 30 performs raw statistical analysis without consideration to generating meaningful thresholds. As an illustration of how threshold processor 30 could generate a non-meaningful current normal threshold 32, if the mean of attribute y is fifty percent (50%) and the standard deviation is twenty percent (20%), threshold processor 30 outputs a new current normal threshold 32 of one-hundred-ten percent (110%). A current normal threshold 32 of one-hundred-ten percent (110%) is not meaningful in terms of realtime detection of out-of-control metrics because it is not possible for the monitored system utilization to ever achieve 110%. A new current normal threshold calculation of one-hundred-ten percent (110%), however, does indicate that there is a pre-existing problem with this attribute, namely that the normal operating range for this attribute is itself out of control. This condition is signaled as a service level exception, discussed hereinafter.

Fault detection system 100 includes a sanity checker 40 which compares each new current normal threshold 32 with a sanity value 48, 49 associated with a particular attribute to determine if it makes sense. Sanity checker 40 preferably receives the maximum and or minimum sanity values 48, 49 for each possible attribute from a sanity value database 45. Sanity value database 45 is a data file or automated data retrieval application which stores the maximum and or minimum sanity values 48, 49 for each attribute. Generally, maximum and or minimum sanity values 48, 49 apply broadly to several attributes of a similar type and do not change once set. This is because the maximum and or minimum sanity values 48, 49 are broadly applicable values which are selected by a systems engineer based on experience, calculations, and or theory. Maximum and or minimum sanity values 48, 49 represent the outer boundaries of acceptable attribute levels. Accordingly, they can be set to levels that are more generally applicable to a greater number of attributes regardless of the normal operating range of each individual attribute, and therefore do not need to be adaptive.

Sanity checker 40 compares the new current normal threshold 32 with the maximum sanity value 48 and limits the new current normal threshold to the lesser of the two, and or compares the new current normal threshold with the minimum sanity value 49 and limits it to the greater of the two. For example, if the maximum sanity value 48 for attribute x is eighty (80), and the newly calculated current normal threshold 32 for attribute x is one-hundred-forty (140), sanity checker 40 limits the current normal threshold 32 of attribute x to eighty (80). Sanity checker 40 preferably maintains a record 41 of the newly calculated current normal thresholds 32 that have been limited by sanity checker 40 in a log 42 to indicate to a system administrator or design engineer that the calculated new current normal threshold 32 for a particular attribute exceeded a maximum sanity value 48 or vice versa, fell short of a minimum sanity value 49. A record in log 42 indicates that the newly calculated current normal threshold 32 exceeds its associated maximum sanity value 48 or falls short of its associated minimum sanity value 49. Thus, records contained in log 42 identify attributes of monitored system 5 which are, by definition, already out of control and which are negatively impacting the monitored system 5. The identified attributes indicate areas of monitored system 5 which require re-design or re-engineering to bring the attributes into control.

Figure 4:
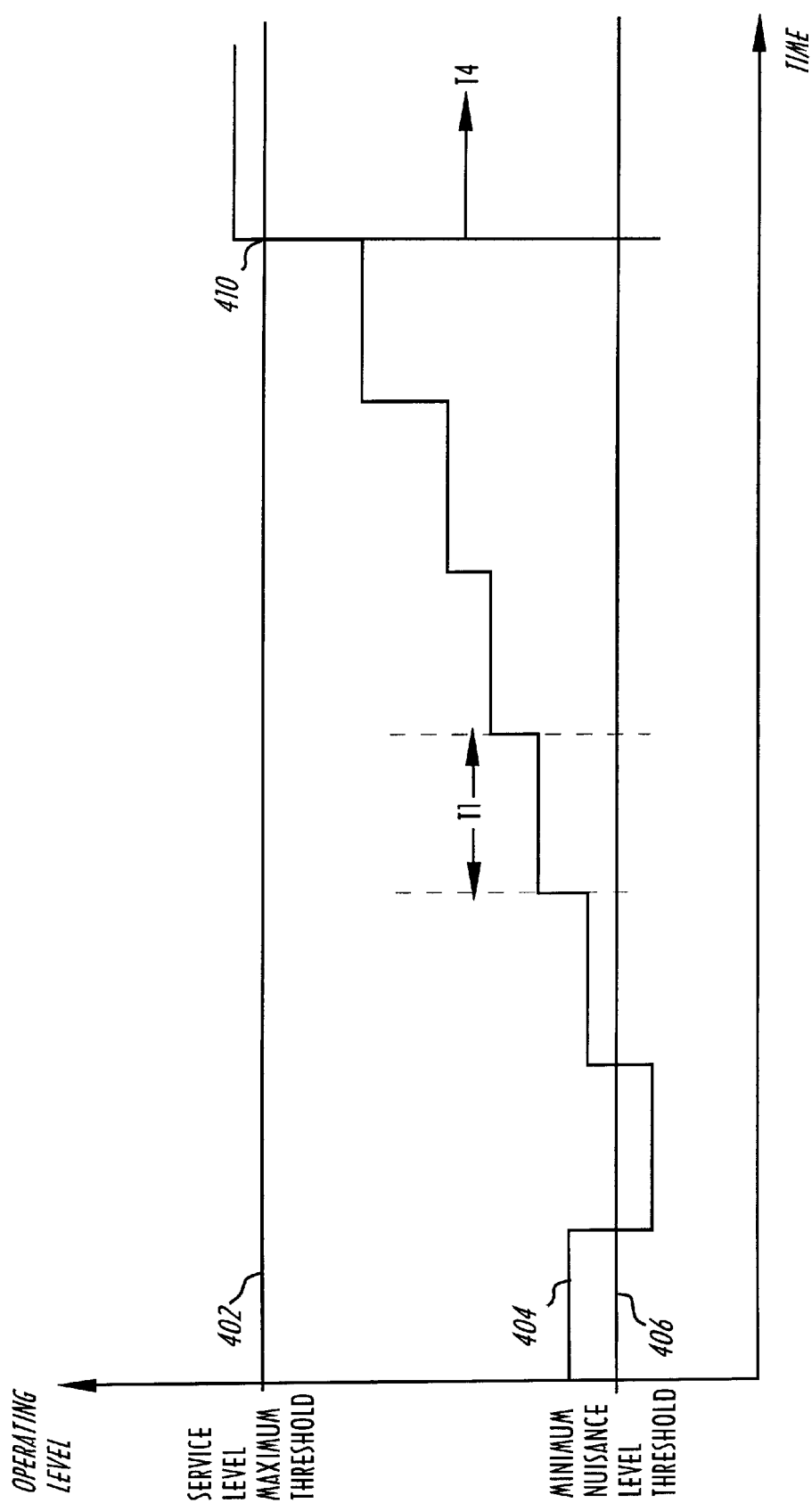
FIG. 4 is a graph of a current normal threshold curve, service level maximum threshold, and minimum nuisance level threshold plotted over time.

FIG. 4 is a graph of a curve 404 which represents the current normal threshold 32 calculated for attribute y plotted over time. What FIG. 4 shows is that as current normal threshold 32 is calculated and updated in realtime for a sliding window of time T1, it is compared to a maximum and minimum sanity value, labeled in FIG. 4 as Service Level Maximum Threshold 402 and Minimum Nuisance Level Threshold 406. Current normal threshold curve 404 varies over time because current normal threshold 32 is recalculated periodically based on a sliding window of time T1 and is recalculated based on the recent history of the attribute's baseline.

Service level maximum threshold 402 represents the level at which a defined service level objective for attribute y is out of bounds. Preferably it is set at a level which indicates an impact to the monitored system 5. If current normal threshold 404 for attribute y reaches service level maximum threshold 402 as shown at point 410 the portion of monitored system 5 represented by attribute y is being negatively impacted. Service level exception generator 70 retrieves limited current normal threshold values records 43 for attribute y from log 42 and history 36 of the current normal threshold 32 for attribute y from history database 35 and generates a service level exception 72 if current normal threshold 404 reaches or exceeds service level maximum threshold 402. A service level exception 72 preferably triggers an action to re-engineer monitored system 5 to bring the current normal threshold of attribute y into control (i.e., in this example, below service level maximum threshold). Point 410 of current normal threshold curve 404 illustrates an example of current normal threshold 32 exceeding the service level maximum threshold 402. Thus, during the period represented by time period T4 monitored system 5 is being adversely impacted and requires urgent attention. Multiple entries for a single attribute in log 42 indicates an undesirable condition. As an illustration, suppose attribute z represents an operating temperature, where service level maximum threshold 402 indicates a maximum temperature level under which the system desirably operates. If current normal threshold 404 begins to consistently exceed service level maximum threshold 402, (i.e., the thresholds 402 and 404 begin to converge), this indicates to the system administrator that the temperature is increasing, and also that it is increasing beyond the desired service level maximum threshold 402. Accordingly, log 42 is an important tool for system administrators in pin-pointing system problems which require immediate attention. As discussed hereinafter, the log 42 is also an important tool in prioritizing the order in which to address various system problems.

Minimum nuisance level threshold 406 operates as a minimum sanity check. If current normal threshold 404 is calculated to be below minimum nuisance level threshold 406 current normal threshold 404 is artificially raised to the minimum level set by minimum nuisance level threshold 406. Minimum nuisance level threshold 406 operates to prevent event notifications 13 that result in nuisances to the system administrator. As an illustrative example, in the case of percent utilization of a network node, if statistical analyzer 20 generates a mean value of 3% network utilization and a standard deviation of 2%, threshold processor 30 would generate a ridiculously low value for current normal threshold 404 on which to generate event notifications 13. Minimum nuisance level threshold 406 thus operates to prevent event notifications on any collected metric that is below the minimum sanity value 49 for its particular attribute. Thus, if a noise spike of 10% on the network is received and the current normal threshold 404 is 5%, it might not be desirable to report it. The system administrator can set the minimum nuisance level threshold 406 to 20% so that no event notifications 13 will be reported unless the collected metric for that particular attribute reaches 20%. Therefore, if current normal threshold 404 is calculated to be below minimum nuisance level threshold 406 current normal threshold 404 is raised artificially to the level of minimum nuisance level threshold 406 to eliminate the nuisance of "false" event notifications 13. Thus, minimum nuisance level threshold 406 operates to allow the current normal threshold to be artificially increased to a reasonable level on which to alarm a system administrator.

Referring again to FIG. 1, threshold implementor 50 operates to reconfigure data collector 10 with the new current normal thresholds in for each attribute. Threshold implementor 50 receives the new current normal threshold 32 output by threshold processor 30 or limited current normal threshold 46 output by sanity checker 40 if it is implemented, and feeds it back into the threshold configuration of data collector 10 thereby closing the system loop.

Preferably, fault detection system 100 comprises a report generator 80 which processes the contents of log file 42 history file 35 and collected metrics file 15 and events file 16 to determine which attributes are most often out of the same limits. Report generator 80 generates reports 82 which summarize the contents of log file 42 history file 35 and collected metrics file 25 and events file 16 to provide the ability to view the history of what each of the individual current normal threshold has done over time, the total number of events, alarms, or service level exceptions generated per attribute, and where in the monitored system 5 that they occurred. This allows the system administrator to quickly identify the area of the system that needs attention.

When generating a report 82 report generator 80 compiles a list of the number of times a service level exception, event, alarm, and or sanity check violation occurred for each attribute over a given period of time (e.g., a month). Report generator 80 then preferably assigns a highest priority to the attribute having the greatest number of service level exceptions, a second highest priority to the attribute having the second greatest number of service level exceptions, and so on. Once the attributes on which a service level exception occurred have been prioritized, attributes on which an alarm was generated are listed next in order of number of times an alarm occurred. As an illustration, suppose a summary report is generated at the end of the month and the report reveals that attribute x was logged in log 42 twenty (20) days of the month, attribute y was logged in log 42 ten (10) days of the month, and attribute z was logged in log 42 one (1) day of the month. The case where attribute x was logged in log 42 twenty (20) days of the month likely indicates that the current normal threshold for attribute x was hovering around the service level maximum for attribute x, and crossing above and below it numerous times.

The alarms 62, service level exceptions 72, and reports 82 assist a systems engineer in identifying problem areas of monitored system 5, and for prioritizing the allocation of available system engineering resources in order to provide attention to those areas of the monitored system 5 where the resources will provide the most good. Alarms 62 are generated when a collected metric for an attribute is beyond the limits of its normal operating range as defined by its associated current normal threshold. Thus, an alarm is generated at a level where the monitored system is being impacted (e.g., a temporarily large percentage of system utilization detected, which manifests itself as a delay in I/O access times experienced by the monitored network system users). Problems having greater impact to the monitored system are indicated via service level exceptions 72. Service level exceptions 72 indicate that the current normal threshold itself for an attribute is out of control. Thus, service level exceptions 72 provide an indicator of those areas of the monitored system 5 which require more urgent attention than those indicated by alarms. Accordingly, in terms of priority, service level exceptions 72 identify problem areas which are higher priority than monitored system areas identified by alarms 62. As a result of re-engineering the areas which impact the monitored system the most (as identified by the service level exceptions 72), many of the less urgent monitored system problems (i.e., those identified by alarms 62) tend to disappear. Accordingly, the present invention improves over prior art fault detection systems which merely identify problems but do not identify particular problem areas or prioritize which problem areas should be addressed first.

In summary, the invention described herein improves over the prior art by calculating a current baseline, employing the current baseline to derive a new current normal threshold, and reconfiguring the fault detection system with the new current normal threshold to adaptively adjust the current normal thresholds of each monitored attribute. In addition to adaptively adjusting the current normal thresholds for each monitored attribute, maximum and or minimum sanity thresholds are used to detect when the normal operating range itself of an attribute is beyond acceptable operating levels. Alarms are generated when one or more collected metrics are detected to be beyond the limits of the attribute's normal operating range and they meet the requirements of a set of rules, and service level exceptions are generated when the calculated current normal threshold of an attribute is detected to be beyond the acceptable operating limits defined for a particular attribute. Alarms and service level exceptions, and reports generated based on the history of an attribute, assist the system engineer in identifying, and prioritizing re-engineering of, problem areas of the monitored system.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A fault detection system which monitors a plurality of attributes of a monitored system, comprising:
a threshold comparator configured with a current normal threshold associated with an attribute of interest which receives a metric corresponding to said attribute of interest, compares said metric to said current normal threshold, and generates an event notification if said metric is not within a limit defined by said current normal threshold, said attribute being one of said plurality of attributes of said monitored system;
a statistical analyzer, coupled to receive said metric, which calculates a baseline associated with said attribute of interest based on a relevant subset of said metric and a set of previously collected metrics corresponding to said attribute of interest;
a threshold processor coupled to receive said baseline which calculates a new current normal threshold associated with said attribute of interest in realtime based on said baseline; and
a threshold implementor coupled to receive said new current normal threshold which reconfigures said threshold comparator in realtime from said current normal threshold to said new current normal threshold.

2. A fault detection system in accordance with claim 1, comprising:
a data collector which extracts a metric corresponding to an attribute of interest from a monitored system.

3. A fault detection system in accordance with claim 1, comprising: an event processor coupled to receive said event notification which generates an alarm.

4. A fault detection system in accordance with claim 3, wherein:
said event processor comprises a rules filter which filters said event notification according to at least one rule, said at least one rule defining a pre-determined condition on which to generate said alarm.

5. A fault detection system in accordance with claim 1, comprising:
a report generator operable to identify, from said event notification, one or more of said attributes which are adversely affecting performance of said monitored system.

6. A fault detection system in accordance with claim 5, wherein:
said report generator is configured to prioritize said one or more attributes of said monitored system in order of those which are adversely affecting said performance of said monitored system the most.

7. A fault detection system in accordance with claim 1, comprising:
a sanity checker coupled to said threshold processor which limits said new current normal threshold to a service level limit which defines a boundary of an acceptable level of operation if said new current normal threshold is not within said service level limit.

8. A fault detection system in accordance with claim 7, comprising:
a service level exception generator which generates a service level exception if said new current normal threshold is limited to said service level limit.

9. A fault detection system in accordance with claim 8, comprising:
a report generator operable to identify, from said service level exception, one or more of said attributes which are adversely affecting performance of said monitored system.

10. A fault detection system in accordance with claim 9, wherein:
said report generator is configured to prioritize said one or more attributes of said monitored system in order of those which are adversely affecting said performance of said monitored system the most.

11. A method for identifying problem areas of a monitored system, comprising the steps of:

extracting a metrics corresponding to an attribute of interest from said monitored system;

comparing said extracted metric with a current normal threshold associated with said attribute of interest;

providing an event notification if said extracted metric is not within a limit defined by said current normal threshold;

calculating a baseline based on a relevant subset of said extracted metric and a set of previously collected extracted metrics;

calculating a new current normal threshold associated with said attribute of interest in realtime based on said baseline; and reconfiguring said current normal threshold in realtime with said new current normal threshold.

12. A method in accordance with claim 11, comprising the step of:

extracting said metric corresponding to an attribute of interest from said monitored system.

13. A method in accordance with claim 11, comprising the step of:

generating an alarm in response to said event notification.

14. A method in accordance with claim 13, comprising the steps of:

filtering said event notification according to at least one rule, said at least one rule defining a pre-determined condition on which to generate said alarm.

15. A method in accordance with claim 11, comprising the steps of:

identifying, from said event notification, one or more of said attributes which are adversely affecting performance of said monitored system.

16. A method in accordance with claim 15, comprising the steps of:

prioritizing said one or more attributes of said monitored system in order of those which are adversely affecting said performance of said monitored system the most.

17. A method in accordance with claim 11, comprising the step of:

limiting said new current normal threshold to a service level limit which defines a boundary of an acceptable level of operation if said new current normal threshold is not within said service level limit.

18. A method in accordance with claim 17, comprising the step of:

generating a service level exception if said new current normal threshold is limited to said service level limit.

19. A method in accordance with claim 18, comprising the steps of:

identifying, from said service level exception, one or more attributes which are adversely affecting performance of said monitored system.

20. A method in accordance with claim 19, wherein:

prioritizing said one or more attributes of said monitored system in order of those which are adversely affecting said performance of said monitored system the most.

* * * * *